(12) United States Patent
Hasan (10) Patent No.: US 9,760,852 B2
(45) Date of Patent: Sep. 12, 2017

(54) SURVEILLANCE TRACKING SYSTEM AND RELATED METHODS

(71) Applicant: Junaid Hasan, Strongsville, OH (US)

(72) Inventor: Junaid Hasan, Strongsville, OH (US)

(\*) Notice: Subject to any disclaimer, the term of this patent is extended or adjusted under 35 U.S.C. 154(b) by 0 days.

(21) Appl. No.: 14/224,329

(22) Filed: Mar. 25, 2014

(65) Prior Publication Data

US 2015/0213391 A1  Jul. 30, 2015

Related U.S. Application Data

(60) Provisional application No. 61/932,320, filed on Jan. 28, 2014.

(51) Int. Cl.
| | |
|---|---|
| *H04N 9/47* | (2006.01) |
| *H04N 7/18* | (2006.01) |
| *G06Q 10/06* | (2012.01) |
| *G06K 9/00* | (2006.01) |
| *G08B 13/196* | (2006.01) |

(52) U.S. Cl.
CPC ... *G06Q 10/06398* (2013.01); *G06K 9/00369* (2013.01); *G06K 9/00771* (2013.01); *G08B 13/19606* (2013.01); *G08B 13/19613* (2013.01); *H04N 7/181* (2013.01)

(58) Field of Classification Search
CPC .............. G08B 13/19606; G08B 13/19613
USPC ................................................. 348/150
See application file for complete search history.

(56) References Cited

U.S. PATENT DOCUMENTS

| | | | |
|---|---|---|---|
| 7,081,818 B2* | 7/2006 | Eckstein et al. | 340/572.1 |
| 7,170,407 B2* | 1/2007 | Wagner | 340/539.13 |
| 7,957,565 B1 | 6/2011 | Sharma et al. | |
| 2004/0111324 A1* | 6/2004 | Kim | 705/22 |
| 2007/0182818 A1* | 8/2007 | Buehler | 348/143 |
| 2009/0034797 A1* | 2/2009 | Senior | 382/104 |
| 2009/0276296 A1* | 11/2009 | Spriegel | 705/11 |
| 2010/0114802 A1* | 5/2010 | Bobbitt et al. | 706/12 |
| 2011/0169917 A1 | 7/2011 | Stephen et al. | |
| 2012/0130774 A1* | 5/2012 | Ziv et al. | 705/7.39 |
| 2012/0147169 A1 | 6/2012 | Harper | |
| 2013/0030875 A1* | 1/2013 | Lee et al. | 705/7.38 |
| 2013/0182114 A1 | 7/2013 | Zhang et al. | |
| 2013/0225199 A1 | 8/2013 | Shaw | |

OTHER PUBLICATIONS

Senior et al., Video Analytics for Retail (2007).

\* cited by examiner

*Primary Examiner* — Jeremaiah C Hallenbeck-Huber (57) ABSTRACT

Embodiments of the invention may relate to systems and/or methods for using video surveillance systems to monitor spaces where people tend to gather such as retail stores, theaters, stadiums, or other public gathering places. Furthermore, embodiments may be adapted to discern elements of human behavior in a video feed, and use these behaviors to draw quantitative and/or qualitative conclusions from the video data. Typical conclusions may include overall conversion rates for a store, conversion/close rates of individual salespeople, traffic patterns within a space, peak traffic times, and so on.

10 Claims, 5 Drawing Sheets

SURVEILLANCE TRACKING SYSTEM AND RELATED METHODS

I. CROSS REFERENCE TO RELATED APPLICATIONS

This application claims the benefit of U.S. provisional patent application No. 61/932,320 filed on Jan. 28, 2014 which is incorporated herein by reference in its entirety.

II. BACKGROUND OF THE INVENTION

A. Field of Invention

Embodiments of the invention may generally relate to systems and methods for video monitoring of people in, for instance, a retail space, and analysis of the video to derive quantitative and/or qualitative conclusions based on human behaviors captured on video.

B. Description of the Related Art

Retail stores and public gathering places such as stadiums need to understand their traffic flow for various reasons. Retail stores, for instance, benefit from accurately understanding their conversion rates (i.e. the ratio of visitors who make a purchase to the total visitors of a retail store), and the effectiveness of individual sales people. A number of technologies have developed over the years for better understanding traffic flow. One such technology is the optical beam break people counter. This type of device is typically installed at entrances and exits of a space to be monitored, such as a retail store. In principle, when a person passes through the entryway or exit they break an optical beam thus triggering a count. Some more sophisticated beam break people counters include a pair of beams which enables the device to determine direction of travel (i.e. entering or exiting) based on the order in which the beams are broken. While these devices can be valuable tools, they have many drawbacks. For example, optical devices tend to be prone to false counts for a variety of reasons including interference from background light, and the devices' inability to distinguish people from inanimate objects.

In more recent years video based systems have emerged for monitoring spaces where people tend to gather. These technologies in general tend to partially overcome some of the false count problems of beam break people counters because they are less prone to interference. However, a number of shortcomings remain unaddressed. For instance, many video systems have limited, if any, capacity for distinguishing between humans and inanimate objects, and may not be at all capable of distinguishing between different classes of human subjects such as customers and salespeople. Existing systems are also deficient in their ability to identify relationships between people in a field of view, such as people traveling and/or shopping together as a group, or the fact that a salesperson is helping a customer make a purchasing decision. Existing systems also are unsuitable for monitoring the work schedules of employees. For instance, they are unable to determine the amount of time that an employee has spent on-site performing his/her duties versus taking break time or otherwise being idle. Some embodiments of the present invention may provide one or more benefits or advantages over the prior art.

III. SUMMARY OF THE INVENTION

Some embodiments may relate to a system for retail resource management, comprising: a plurality of electronic video cameras each having an electronic video data output, the plurality of electronic video cameras being adapted for installation in a space to be monitored and configured for monitoring the space; a central computer adapted to receive the electronic video data outputs of the plurality of video cameras; and a computer program installable on the central computer and adapted to: distinguish human subjects from inanimate objects; distinguish agent human subjects from non-agent human subjects, in the video data output from the plurality of electronic video cameras; identify interacting non-agent human subjects by correlating the non-agent human subjects' movements, proximity, length of time that the human subjects spend within a predefined proximity of each other within the monitored space, whether the human subjects make bodily contact with each other, duration of bodily contact between human subjects, parts of the human subjects' bodies involved in bodily contact, whether the human subjects make eye contact, duration of eye contact; and associate individual non-agent human subjects, and/or groups of interacting non-agent human subjects, with an agent by correlating, relative to the agent, the non-agent human subjects' movements, proximity, length of time that the non-agent human subject spends within a predefined proximity of the agent, whether the non-agent human subjects make bodily contact with the agent, duration of bodily contact between the agent and non-agent human subjects, parts of the agent and non-agent human subjects' bodies involved in bodily contact, whether the agent and non-agent human subjects make eye contact, and duration of eye contact.

According to some embodiments, the computer program is further adapted to count the number of non-agent human subjects, or correlated groups of non-agent human subjects, who enter, who are present in, and/or who exit the monitored space.

According to some embodiments the computer program is further adapted to calculate retail conversion rates based on the number of non-agent human subjects, or correlated groups of non-agent human subjects, visiting the monitored space.

According to some embodiments the computer program is further adapted to calculate the close rate of an agent.

Some embodiment may further comprise a plurality of wireless identification devices adapted to be paired with agents of the monitored space, and at least one wireless reader installable in the monitored space and adapted to read identification data contained in the wireless identification devices.

According to some embodiments the central computer is further adapted to receive identification device data from the at least one wireless reader and record the identification device data as a function of time.

According to some embodiments the at least one wireless reader comprises a plurality of wireless readers installable in the monitored space according to a predetermined spatial pattern, and wherein the central computer is further adapted to receive signals from the plurality of wireless readers to calculate and track the position of agents in the monitored space.

According to some embodiments the computer program is further adapted to track the amount of time that an agent spends in areas of the monitored space other than the sales floor.

According to some embodiments the computer program is further adapted to track the number of non-agent human subjects, or groups of interacting non-agent human subjects, who leave the monitored space without being associated with an agent.

Some embodiments may relate to a system for retail resource management, comprising: a plurality of electronic video cameras each having an electronic video data output, the plurality of electronic video cameras being adapted for installation in a monitored space and configured for monitoring the retail; a central computer adapted to receive the electronic video data outputs of the plurality of video cameras; a computer program installable on the central computer and adapted to distinguish human subjects from inanimate objects, and to distinguish agent human subjects from non-agent human subjects, in the video data output from the plurality of electronic video cameras, the computer program being further adapted to identify interacting human subjects by correlating the human subjects' movements, proximity, engagement, and/or length of time within a predefined proximity to each other within the monitored space, the computer program being still further adapted to associate individual non-agent human subjects, and/or groups of interacting non-agent human subjects, with an agent by correlating the non-agent human subjects' movements, proximity, engagement, and/or length of time within a predefined proximity relative the agent, wherein the computer program is further adapted to count the number of human subjects, or correlated groups of human subjects, who enter, who are present in, and/or who exit the monitored space, wherein the computer program is further adapted to calculate retail conversion rates based on the number of non-agent human subjects, or correlated groups of non-agent human subjects, visiting the monitored space, wherein the computer program is further adapted to calculate the close rate of an agent; a plurality of wireless identification devices adapted to be paired with agents of the monitored space; and a plurality of wireless readers installable in the monitored space according to a predetermined spatial pattern and adapted to read identification data contained in the wireless identification devices, wherein the central computer is further adapted to receive wireless identification device data from the plurality of wireless readers and record the wireless identification device data as a function of time, and wherein the central computer is further adapted to receive signals from the plurality of wireless readers to calculate the position of an agent in the monitored space.

Some embodiments may relate to a method of retail resource management comprising the steps of: installing a plurality of electronic video cameras in a monitored space, each electronic video camera having an electronic video data output, wherein the visual fields of the electronic video cameras cooperate to encompass substantially all of the monitored space, and/or substantially all of a sales floor within a monitored space; providing a central computer adapted to receive the electronic video data outputs of the plurality of video cameras, the central computer including peripheral video display device; distinguishing human subjects from inanimate objects in the video data output from the plurality of electronic video cameras; distinguishing agent human subjects from non-agent human subjects, in the video data output from the plurality of electronic video cameras; identifying interacting human subjects by correlating the human subjects' movements, proximity, engagement, and/or length of time within a predefined proximity to each other within the monitored space; and associating a non-agent human subject and/or a group of non-agent human subjects with an agent.

Embodiments may further comprise the step of counting the number of human subjects, or correlated groups of human subjects, who enter, who are present in, and/or who exit the monitored space.

Embodiments may further comprise the step of calculating retail conversion rates based on the number of non-agent human subjects, or correlated groups of non-agent human subjects, visiting the monitored space.

Embodiments may further comprise the step of calculating the close rate of an agent.

Embodiments may further comprise the step of providing a plurality of wireless identification devices adapted to be worn by agents of the monitored space, and at least one wireless reader installable in the monitored space and adapted to read identification data contained in the wireless identification devices.

Embodiments may further comprise the step of recording the identification device data from the at least one wireless reader as a function of time.

Embodiments may further comprise the step of providing a plurality of wireless readers installable in a monitored space according to a predetermined spatial pattern, wherein a computer is adapted to receive electronic signals from the plurality of identification device readers to calculate and track the position of agents in the monitored space.

Embodiments may further comprise the step of tracking the amount of time that agents spend in areas of the monitored space other than the sales floor.

Embodiments may further comprise the step of tracking the number of non-agent human subjects, or groups of interacting non-agent human subjects, who leave the monitored space without being associated with an agent.

Other benefits and advantages will become apparent to those skilled in the art to which it pertains upon reading and understanding of the following detailed specification.

Definitions

As used herein the term elemental behavior means a human behavior that is a component of a more complex human behavior. For example, a complex human behavior such as individuals associating as a group may be made up of one or more of the following elemental behaviors: ambulating along a similar path, making eye contact, making bodily contact, and being in close proximity to each other. Notwithstanding that the term "elemental" typically means indivisible, elemental behaviors may be made up of other still simpler behaviors. Elemental behaviors may also be made up of properties.

Properties in this context include all of the objective or quantifiable components necessary to define a behavior. In the case of a bodily contact behavior, a property could be the identity of the specific body parts or body regions which are making contact, the fact that the contacting parts are components of separate bodies, and the duration of the contact. Embodiments may divide properties into a collection of simpler properties and may do so to whatever degree of granularity that is necessary to adequately model a behavior. In general, properties are objectively determinable either as a quantity or in terms of their presence or absence. For instance, the occurrence of bodily contact can be determined using machine vision principles which analyze patterns in video data and probabilistically associate meanings with patterns. Properties of a behavior may or may not be required to be present. For example, a behavior may be made up of a set of properties, some of which must be present and/or reach a certain threshold value in order to establish the occurrence of the behavior, and others of which may be absent or indeterminate without ruling out the occurrence of the behavior.

IV. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

V. DETAILED DESCRIPTION OF THE INVENTION

Embodiments of the invention may generally relate to systems for counting people in monitored spaces where people are expected to gather such as retail spaces, stadiums, or public gathering places. Embodiments may also include means for tracking the position of people in a monitored space, discerning behavioral interactions and/or complex relationships between people in a monitored space, and/or calculating certain metrics to extract information from data collected by embodiments.

Embodiments may include a plurality of electronic video cameras, which may be installable in a space to be monitored. The cameras may be advantageously installed so that their fields of view abut or overlap, thereby ensuring that the entire space is monitored with minimal blind spots. Suitable cameras include at least one video data output port suitable for interfacing with a general purpose computer. Accordingly, the cameras may communicate with a central computer which may be programmed to receive, record, render, display, and/or analyze the electronic video data. Embodiments may also include controlling the plurality of cameras with the central computer.

A video analysis program according to embodiments of the invention may include code for distinguishing human subjects from inanimate objects by, for instance and without limitation, facial recognition and/or machine vision methodologies, and/or by identifying body shapes and/or patterns of movement characteristic of human subjects. Once an embodiment identifies a pattern in video data as representing a discrete human subject, the human subject may be counted, and its movements and activities within the monitored space may be tracked and analyzed.

Additionally, an embodiment such as a video analysis program may be adapted to distinguish one classification of human subject from another. For instance, it may be advantageous to distinguish employees or agents of the monitored space from visitors or customers. As used herein, the term agent includes the typical legal meaning of one acting within the authorization of another, and therefore includes employees. The terms agent and employee may be used together herein; however, instances where only the term agent or employee is used do not necessarily indicate the exclusion of one or the other, as will be evident from context.

A number of methodologies for distinguishing one class of human subject from another may be suitable. In embodiments using facial recognition technologies, an embodiment may be pre-programmed with the facial recognition data of agents of a monitored space. Thus, the embodiment would be capable of categorizing human subjects as an agent or non-agent according to its database of known agents. Alternatively, in one embodiment agents of the monitored space are distinguished by providing them with a wireless identification and/or positioning device such as an RFID tag, a suitably programmed smartphone, or a purpose-built identification and/or positioning device. In some embodiments, a signal from a wireless identification and/or positioning device may simply identify the holder's classification as an agent; however, in other embodiments the signal may include more specific identifying information such as a personal name or identification code. Embodiments that include positioning features may be adapted to co-register positioning data with video data. Thus, an embodiment may identify an agent in a video data stream using a combination of video and positioning data.

A variety of positioning technologies may be suitable for embodiments described herein, and in some instances accuracy may be improved by combining two or more positioning technologies. For instance, in some embodiments Global Positioning System (GPS) technology may be used for tacking the position of agents within a monitored space who are provided with a GPS enabled device such as a smartphone. However, GPS signals are known to be relatively weak and therefore may not be accessible in some indoor environments, such as basement levels, deep interior positions within a building, or in shielded structures such as those having metal frames and/or reinforced concrete walls. In embodiments where GPS is not available or not practical, other positioning technologies may be used such as Low-Earth Orbit Iridium satellites, various radio-frequency signal strength methods including Wi-Fi positioning and beacon grids, inertial navigation systems, magnetic compasses, and/or two-dimensional magnetic field sensors.

Low-Earth Orbit Iridium (LEOI) satellites are similar to GPS satellite technology but since LEOI satellites orbit at a much lower altitude than GPS satellites their signal strength is much higher (i.e. about 30 dB) at the Earth's surface. Thus, LEOI signals are better able to penetrate building interiors. Accordingly, embodiments incorporating LEOI technology would include a LEOI enabled device kept on the person of an agent, which regularly triangulates its position based upon signals from a plurality of LEOI satellites. The LEOI enabled device would then wirelessly report its position back to the central computer so that the position of the holder of the device can be tracked by the embodiment and/or co-registered with video data.

Alternatively, rather than co-registering video and positioning data, embodiments may match paths of travel determined from video data with those of positioning data by determining statistical similarity of the respective paths to a predetermined degree of confidence. Thus, the path of movement of a human subject determined through video data may be identified as that of an agent if the path can be statistically matched spatially and temporally to a path calculated with positioning data. This same statistical similarity principle may be applied to any combination of video and positioning technologies.

Wi-Fi positioning systems operate by placing a plurality of Wi-Fi access points in a grid pattern throughout a monitored space where each access point is at a known location. The strength of a Wi-Fi signal at the point of broadcast (i.e.

at an access point's transmitter) is known, and the strength of the Wi-Fi signal on the receiver side can be measured. Since signal strength drops at a known rate as a function of distance from the broadcast source, the position of a Wi-Fi enabled device can be triangulated by measuring the strength of signals originating from a plurality of access points. One skilled in the art will appreciate that it would also be possible to reverse the transmitter/receiver relationship set forth above, by having the Wi-Fi enabled device broadcast a signal which is measured at the access points. Additionally, Wi-Fi positioning systems using time difference methodologies for triangulating position may also be suitable; however, time difference systems may be less accurate over the relatively short distances typical of indoor environments.

Radio-frequency beacon grids operate on a similar signal strength measurement principle as that of Wi-Fi positioning systems, but do not use the Wi-Fi communications protocol. Bluetooth technology may also be suitable for indoor positioning using signal strength measurement methodologies. A wide variety of radio frequency wireless technologies may be similarly applied.

Another form of positioning using radio-frequency signal strength involves using active RFID tags as the radio source. This methodology may be suitable in some embodiments; however, one skilled in the art will recognize that RFID tags tend to have a relatively short range, and thus require a relatively high density of detectors as compared to other radio-frequency methods. Therefore, it may be desirable in some RFID enabled embodiments to amplify the RFID signal output to promote a greater detectable range. Embodiments may include RFID devices that are programmed with a code specifying a particular individual so that the holder of the RFID device may be identified in addition to his position being calculated.

Inertial navigation systems using various forms of gyroscopes may also be suitable in some embodiments. Very precise position tracking can be achieved using, for instance, elecromechanical and/or fiber optic gyroscopes. Embodiments may use inertial navigation systems in cooperation with radio-frequency signal strength methods to further improve the accuracy of position calculations.

Magnetic compasses and two-dimensional magnetic field positioning technologies may be used alone or in combination to calculate position relative to the Earth's magnetic field. Since compasses are inherently one-dimensional such devices can only be used in combination with other technologies to determine position. However, a two-dimensional magnetic field positioning system using a plurality of magnetometers may operate suitably without additional positioning technologies.

In addition to distinguishing between human subjects and inanimate objects, as well as between agents and non-agents, some embodiments may also be suitably programmed to discern behavioral relationships among human subjects. For example, a more accurate conversion rate may be calculated if a family of four shopping together is counted as one entity because in many instances only one member of the family is responsible for making a purchase. Complex human behaviors such as associating with each other in a group can be distinguished in video data in part by tracking the movements of each individual in the monitored space, and correlating their movements according to factors including their proximity to each other, the amount of time they spend within a predefined distance of each other, whether they make physical contact and the duration of the contact, and whether they make eye contact and the duration of the eye contact. With particular regard to bodily contact, it may also be advantageous to consider which parts of the human subjects are making contact. For instance, palm-to-palm contact having a duration of more than several seconds may indicate a couple holding hands, whereas very brief contact of some parts of the body may indicate an accidental collision. Each of the foregoing factors can be determined using a combination of human or machine vision, and statistical analysis as explained herein.

In addition to discerning groups of associated individuals, the human or machine vision, and statistical methodologies described herein may be applied to discerning interactions between agents and non-agents of the monitored space, e.g. between a customer and a salesperson. For example, an embodiment may identify a human subject as a non-agent, and may similarly identify a second human subject as an agent. The embodiment may further track the position of both subjects over time, and through statistical analysis of the video data may determine that the agent and non-agent are interacting based upon their proximity to each other for a predefined period of time, whether they are facing each other, and/or whether they are making periodic eye contact. Accordingly, the embodiment may associate the agent (e.g. salesperson) and non-agent (e.g. customer). This may be particularly helpful in, for example, a retail environment where the effectiveness of salespeople could be advantageously monitored, e.g. in determining what percentage of engagements between a particular salesperson and store visitors result in a sale. Thus, improved conversion rates may be calculated.

As mentioned more generally above, certain elemental human behaviors may be observed either manually or through machine vision, and both quantitative and qualitative information may be extracted from these observations to draw conclusions regarding more complex human behaviors such as detecting persons associating themselves with each other, traveling in groups, or engaging in conversation. Particular elemental behaviors will now be discussed in more detail. The following applies equally to manual observations and observations made through existing machine vision technologies.

Similar paths of movement (i.e. path tracking) of persons through a space, which substantially coincide both spatially and temporally, suggest a group behavior. Video data collected by an embodiment may be analyzed to establish the paths of individuals. In one embodiment, a probability that a path tracking behavior is being observed can be calculated by first establishing an empirical threshold distance, $\langle d \rangle$, between two individuals which, according to an empirically determined average, persons consider to be within their personal social space. In this context, the term personal social space is the region in which one tolerates the presence of persons with whom he/she has a personal association or connection, such as a friend or spouse. Others entering one's personal social space are expected to be tolerated either not at all or for only short periods of time. Accordingly, we would expect that a person whose personal social space has been invaded would move sufficiently to re-establish his space within an empirically determined average period of time such as, and without limitation, in less than 30 seconds, or in less than 5 to 10 seconds. Therefore, the ratio of the total observed time ($t_{Tot}$) in a monitored space to the sum of time ($\Sigma t$) that the distance between a group member is within the boundary of at least one other group member's personal social space $\langle d \rangle$, is a property of a path tracking behavior.

$$\frac{\sum t}{t_{Tot}}; \quad \text{(eq. 1)}$$

Specifically, eq. 1 is the probability of finding two individuals within each other's personal social space ⟨d⟩ at any given moment in a monitored space based on analysis of a video data stream. It may be advantageous to multiply eq. 1 by an empirical linear scaling factor (s) to relate the probability of finding individuals within each other's personal space to an empirically determined probability ($p_{track}$) that the individuals are intentionally traveling together.

$$p_{track} = s\frac{\sum t}{t_{Tot}}; \quad \text{(eq. 2)}$$

In some embodiments $p_{track}$ may be only one of a plurality of properties and/or elemental behaviors used in calculating a probability for the presence of a grouping behavior, and some factors may be regarded as more significant than others. Accordingly, $p_{track}$ may be multiplied by an empirical weighting factor $w_{track}$ as shown in eq. 3.

$$(w_{track})(p_{track}); \quad \text{(eq. 3)}$$

Thus, a general equation for a weighted average of probabilities ⟨p⟩ calculated for an arbitrary number (n) of properties and/or elemental behaviors would be $$\langle p \rangle = \frac{w_1 p_1 + w_2 p_2 + \dots w_n p_n}{w_1 + w_2 + \dots w_n}; \quad \text{(eq. 4)}$$

Notwithstanding that some embodiments may use a weighted average ⟨p⟩ of probabilities as shown generally in eq. 4, in other embodiments it may be advantageous to consider the probabilities of elemental behaviors individually. For example, a couple shopping together may exhibit a clear path tracking behavior which by itself may establish an association between them to a high degree of certainty; however, the couple may score low in other elemental behaviors such as eye contact, bodily contact, or engagement in conversation. If all of these factors were considered in the form of a weighted average, the embodiment may tend to yield an incorrect result suggesting no association. Nonetheless, the couple is behaving as a group and should be treated accordingly for the purpose of calculating conversion rates. Thus, the decision to treat two arbitrary persons found in a video data stream as an associated pair of individuals may be based on whether any one elemental behavior reaches a predetermined threshold probability value. For instance, in one non-limiting example, if a path tracking behavior is established to a 99% certainty then all other behavioral elements may be neglected, and the individuals may be treated as an associated pair.

Additionally or alternatively, embodiments may require a plurality of elemental behaviors to reach predetermined threshold values before neglecting other elemental behaviors. Furthermore, it may be advantageous to employ a tiered system where a greater number of elemental behaviors must be considered as the maximum probability among them decreases. In other words, if no elemental behaviors can be established to a high enough degree of certainty to be dispositive by itself, then a better decision can be made by considering more elemental behaviors. In instances where none of the probabilities of the elemental behaviors being considered are dispositive it may be advantageous to model the probability of the occurrence of an association behavior as an average or weighted average of probabilities of elemental behaviors as in eq. 4.

Another behavioral element that may be considered, according to embodiments of the invention, for the purpose of establishing an association among individuals is bodily contact. This is a particularly complex aspect of human behavior because its meaning depends on a plurality of factors including the specific body parts making contact, the duration of the contact, as well as more subtle factors such as facial expression and the content of conversation. Furthermore, different rules for establishing meaning apply to different combinations of body parts in contact. Nonetheless, meaningful conclusions may be drawn from video data by applying certain logical steps and statistical analysis. For instance, an embodiment may recognize or be suitably programmed to recognize parts and regions of a human body including without limitation heads, faces, arms, hands, legs, feet, and torsos. Furthermore, the embodiment may recognize or be programmed to recognize body parts as components of discrete bodies, and whether one or more parts of one body are in contact with one or more parts of another. Since contact between different combinations of body parts can have differing meanings, an embodiment may be programmed or trained to associate predetermined meanings with particular combinations when a given combination can be established to a threshold level of certainty. For example, if a handshake behavior can be established to a 95% level of certainty between a salesperson and a visitor to a store, then the embodiment may associate a certain meaning with that handshake behavior, e.g. that the salesperson is now responsible for the visitor and the purchasing decision of that visitor will be factored into the salesperson's close rate.

In addition to the bare combination of contacting body parts, an embodiment may also consider other properties, such as the duration of contact, to associate a combination with a meaning. For instance, palm-to-palm contact between the left hand of one body and the right hand of another lasting for more than a predetermined threshold duration (e.g. more than $t_1$ seconds) may be classifiable as a hand holding behavior. In contrast, palm-to-palm contact between the right hand of one body and the right hand of another body having a duration of up to $t_2$ seconds may be classifiable as a handshake. The former may be used as a factor in statistically establishing the existence of a grouping behavior where two individuals associate themselves as a group traveling together, and the latter may be used as a factor in establishing the existence of a greeting behavior which may associate a customer with a salesperson, for instance.

In general, probabilities for establishing the existence of a bodily contact behavior can be derived empirically in a manner similar to that of the path tracking behavior described above; the bodily contact behavior may be modeled in terms of quantifiable statistical parameters including elemental behaviors and properties. For instance, an elemental behavior such as a handshake may in one embodiment be modeled as a set of properties including: (i) the presence of two discrete bodies, (ii) positioned within arms reach of each other, (iii) where the right hands or left hands of the respective bodies are contacting palm-to-palm, (iv) for a duration within a predefined empirically determined range. Thus, if properties (i) through (iii) are found in the affirmative, and the quantity of property (iv) is within the predefined range, then the embodiment may conclude that a handshake behavior has occurred. In some embodiments, properties such as (i) through (iii) may entail appreciable uncertainty and thus, the presence of the handshake behavior may be established based upon an acceptable degree of certainty.

Another elemental behavior that can be used to decide whether individuals have associated with each other includes relative body position. It is generally understood that when persons are engaged in conversation they tend to face one another. Therefore, determining and monitoring the body position of persons relative to each other can be a factor in establishing a grouping behavior, or the development of an association between a customer and salesperson. Embodiments may use relative body position in connection with other elemental behaviors and properties including proximity of the individuals, the presence or absence of a path tracking behavior, and/or the length of time that individuals' relative body positions suggest association, among others.

For instance, in one embodiment an association between a salesman and a customer may be modeled in terms of the following properties and elemental behaviors: (i) the presence of two discrete bodies, (ii) within a predefined proximity of each other, (iii) where the bodies are oriented in a face-to-face relation to each other, (iv) for a predefined minimum length of time, (v) a handshake behavior occurs, and (vi) no other salesman establish an intervening association prior to the customer making a purchase.

Eye contact is still another factor which may be applied to deciding whether individuals have associated themselves with each other. Again, it is generally understood that eye contact is a component of communication between individuals, often accompanies conversation, and in general suggests the formation of an association between individuals. Thus, detecting and monitoring eye contact can be a useful factor for calculating the probability of a grouping behavior occurrence, and/or determining whether a salesperson has greeted or is assisting a customer. Known methods for tracking the gaze of an individual may be applied to the problem of detecting eye contact, by determining whether the gaze of one person meets or coincides with the gaze of another. It may also be beneficial to couple eye contact with other elemental behaviors such as proximity of the individuals to each other, the frequency of making eye contact, the duration of time and/or average duration of time that eye contact is maintained, and the ratio of the total time which two individuals are facing each other while in close proximity to the time which the individuals are in eye contact. As with all other elemental behavioral indicators discussed herein, it is contemplated that eye contact would be detected in video data either manually or through machine vision principles, and that it would be statistically modeled to relate eye contact to a probability that more complex human behavior has occurred such as a grouping behavior, a greeting, or other associating behavior.

Embodiments may integrate with point of sale systems so that conversion rates for particular employees may be calculated. For example, an embodiment may identify a visitor to a retail store as a human and may begin tracking the person's position. A salesman may be identified in the video engaged in an associating behavior with the visitor, which may result in the salesman being credited with a customer interaction. The percentage of customer interactions resulting in sales (i.e. the conversion rate) could then be calculated as the ratio of customer interactions of a particular salesman to the total number of sales attributed to the salesman. Generally, sale attributions are manually recorded at the point of sale system where the salesman enters his identifying information, such as a name or employee number.

As discussed above, embodiments may include tracking visitor traffic flow in a monitored space. More particularly, a traffic flow analysis may include identifying patterns in the data to allow for future planning. For instance, certain days of the week or times of day may tend to be busier than others and may warrant scheduling additional staff. Certain areas of a monitored space may receive more traffic than others, and therefore additional personnel may be allocated to these areas accordingly. Embodiments may also calculate average wait times of customers before being assisted, and may further relate this quantity to the rate at which potential customers leave without buying and/or being helped.

Figure 1:
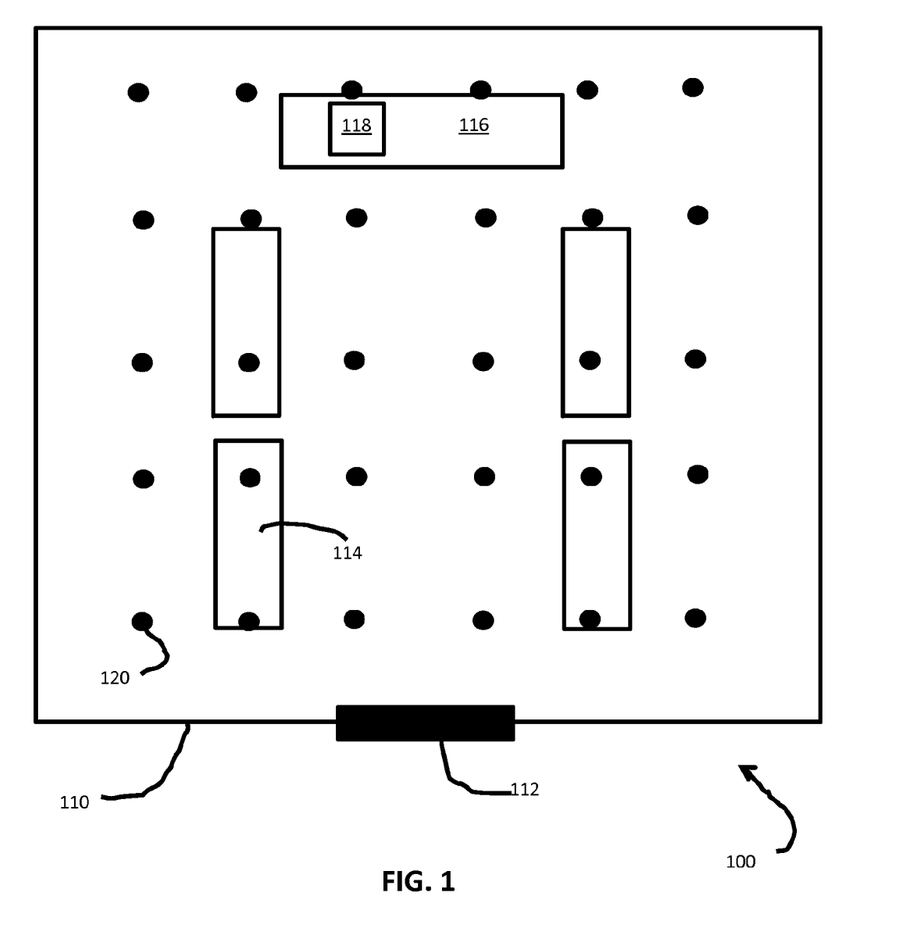
FIG. 1 is a plan view diagram of a monitored space showing a camera grid.

Turning to the Figures, FIG. 1 is a plan view of an embodiment 100 comprising a monitored space 110 with an entry/exit doorway 112. The monitored space 110 has an array of video cameras 120 evenly spaced in a grid pattern covering the entire space 110. The fields of view of the respective cameras 120 overlap with their nearest neighbors thereby minimizing blind spots. The space 110 also contains a set of four point-of-sale displays 114 which may be shelving for displaying products for sale. A counter 116 is located in the rear of the space 110 and has a cash register system 118 disposed on top of it. The camera array 120 captures video of all persons in the monitored space, and feeds the video data to a central computer system suitably programmed to analyze the data as described herein. Alternatively, a manual embodiment may involve a computer system programmed to simply display the video data for manual interpretation by a human observer.

Figure 2:
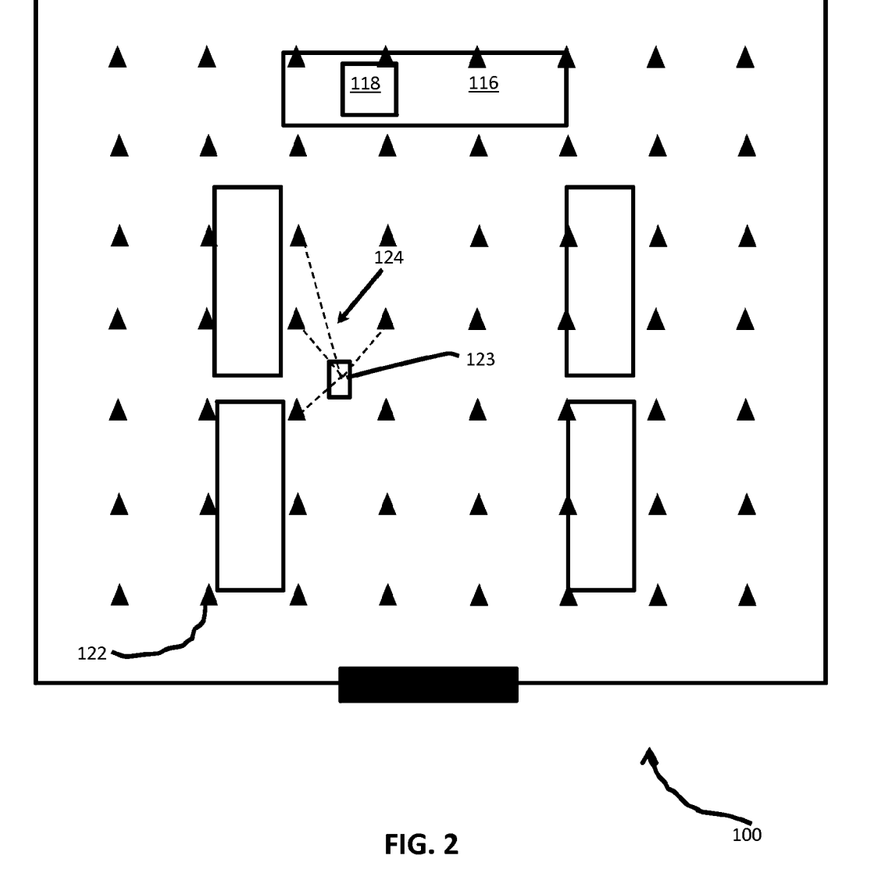
FIG. 2 is a plan view diagram of the monitored space of FIG. 1 showing a Wi-Fi grid for indoor positioning.

FIG. 2 is a plan view illustration of the same space 110 as FIG. 1, but rather than showing the layout of cameras 120, FIG. 2 illustrates the layout of indoor Wi-Fi positioning devices. In a typical embodiment the camera 120 and Wi-Fi access point 122 grids would overlay, but for the sake of clarity they are shown in separate figures. The Wi-Fi access point grid 122 operates on a signal strength measurement principle. Thus, as a Wi-Fi enabled device 123 moves through the grid 122 its position relative to the grid 122 may be calculated through a triangulation algorithm. In the illustrated embodiment, the Wi-Fi enabled device 123 receives a plurality of signals 124 from various access points 122. The strength of each of the detected signals 124 is used to determine the device's 123 distance from the particular access point 122. One position in the monitored space will satisfy all of the distance calculations simultaneously, and thus corresponds to the position of the Wi-Fi enabled device 123. The Wi-Fi enabled device 123 then wirelessly transmits its position to a central computer system which records and tracks the data.

In the present embodiment, only agents of the monitored space are provided with Wi-Fi enabled devices 123 suitably programmed to communicate with the Wi-Fi access point grid 122. Therefore, all positions calculated by this method are assumed to be the positions of agents. Furthermore, the particular devices 123 carried by individual agents may include a code identifying the agent. Accordingly, the position of each individual agent in the monitored space can be known, tracked, and recorded.

Figure 3:
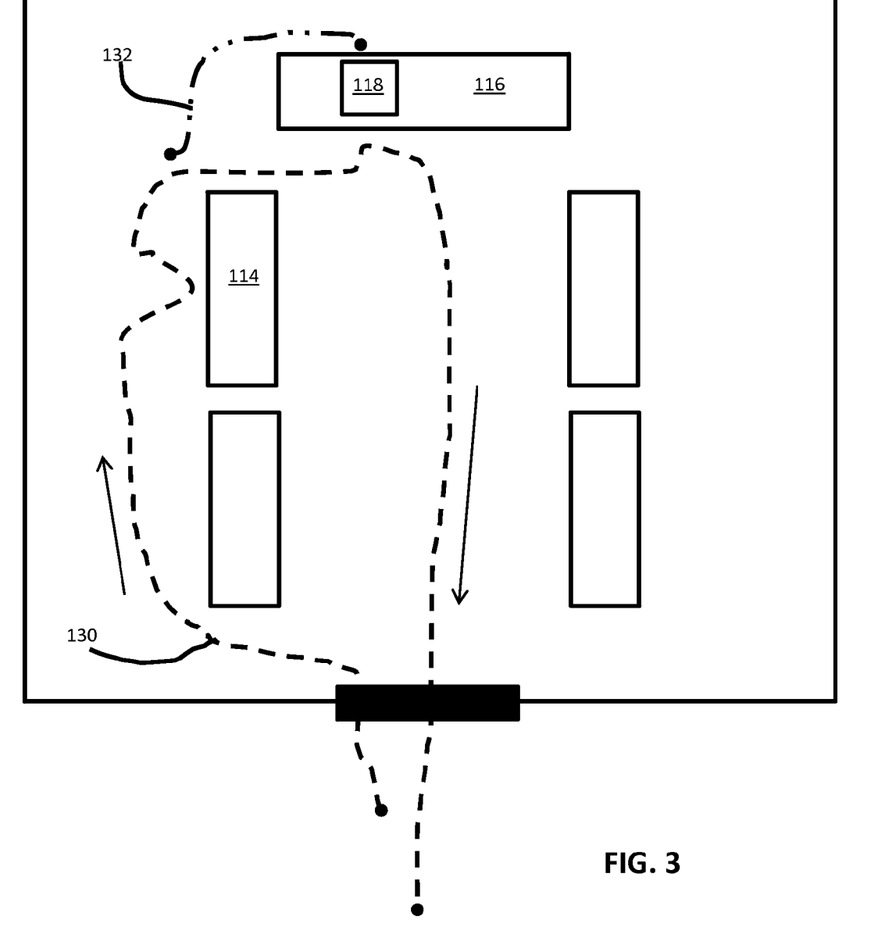
FIG. 3 is a plan view diagram of the monitored space of FIG. 1 showing the paths of travel of an agent and a visitor as determined by an embodiment.

FIG. 3 is a third plan view illustration of the same embodiment 100 as FIGS. 1 and 2, but the camera 120 and Wi-Fi access point 132 grids have been removed. FIG. 3 shows the paths of a customer 130 and a salesman 132 in the monitored space 110. The customer enters the store (i.e. the monitored space 110) at the entrance/exit doorway 112 and proceeds toward the back of the store along the left side of the figure. The customer's path deviates toward a product shelf where he pauses for a moment, and then proceeds further toward the rear of the store where he encounters a salesman. The salesman then moves toward the cash register 114 along path 132 and at the same time the customer moves toward the opposite side of the counter 116 near the cash register 114. A purchase is made, and then the customer proceeds to leave the monitored space 110. In an automated embodiment, a suitably programmed computer determines that a pattern in the video data feed is a human using, for example, facial recognition and then tracks the position of the human subject for the rest of the time he is in the monitored space. The subject is presumed to be a visitor because the computer receives no indication that the subject is an employee.

In contrast, the salesman in FIG. 3 is also tracked in the video data stream, but the embodiment recognizes him as an employee because he carries a Wi-Fi enabled device transmitting his position and identity at predetermined intervals. Furthermore, since the video camera 120 and Wi-Fi access point grids are both fixed to the same structure (e.g. the interior surfaces of the same store) and are each in known positions, the data collected by the respective grids is inherently co-registered. Therefore, it is straightforward to overlay the video path data and the Wi-Fi path data and recognize that they represent the path of the same person. This determination may be made intuitively by visual inspection or statistically by, for instance, a regression method.

Figure 4:
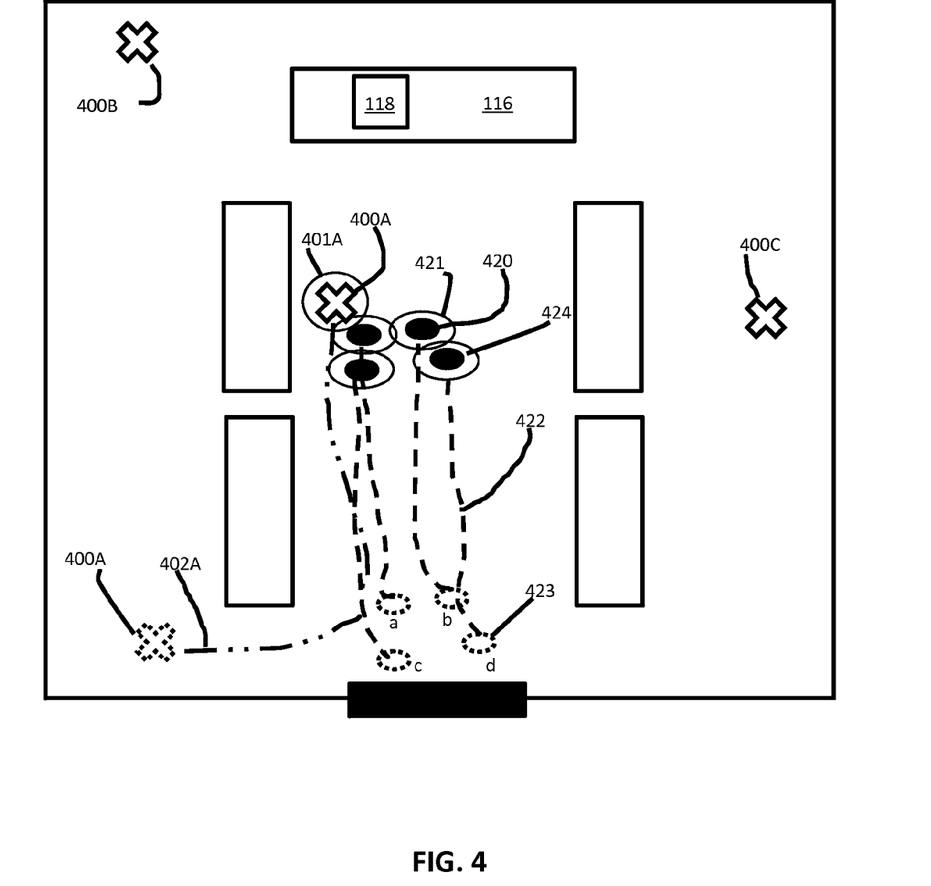
FIG. 4 is a plan view diagram of the monitored space of FIG. 1 illustrating detection of a grouping behavior and a greeting behavior.

FIG. 4 is an illustration of an embodiment detecting two separate associating behaviors. One is a grouping behavior of four visitors collectively designated as 420, and individually labeled a, b, c, and d. The other is a greeting behavior between a salesman 400A and the four visitors 420. Regarding the visitors 420, their respective paths 422 are shown in dashed lines connecting a starting point 423 of each individual (dashed oval) to an end point 424 (solid oval) of their respective paths 422. The outer boundary of each visitor's personal social space 421 is drawn as an oval around each individual visitor 420. An embodiment may determine that a grouping behavior has occurred, in part, because each of the individuals 420 overlap their personal social space 421 with at least one other member of the group according to a probability calculated by eq. 1, i.e.

$$\frac{\sum t}{t_{Tot}},$$

where $t_{Tot}$ is the total observed time from the illustrated starting point 423 shown in FIG. 4 to the illustrated end point 424 of the visitors 420, and $\Sigma t$ is the sum of the time that the distance between any two persons in the group 420 is within the boundary of at least one other group member's personal social space $\langle d \rangle$ during the observation time period $t_{Tot}$. Since there are four members of this group, the probability of finding group member a within the personal social space of any other group member at any instant during the observation time period is:

$$\frac{\sum (t_{a,b} + t_{a,c} + t_{a,d})}{t_{Tot}}; \quad \text{(eq. 5)}$$

where $t_{a,b}$ is the time that group member a spends within the personal social space of group member b, and so on. Thus, $\Sigma(t_{a,b}+t_{a,c}+t_{a,d})$ is the total time that group member a spends within the personal social space of any other group member. Similar probabilities can be calculated for each member of the group, and each member can be considered part of the group if its probability is at or above an empirically determined value.

With further reference to FIG. 4, we turn to the associating behaviors of the three illustrated salesmen 400A, 400B and 400C. Salesmen 400B and 400C are both located well outside the personal social space $\langle d \rangle$ of the group members 420, and remain stationary during the observed time period $t_{Tot}$, thus showing no path tracking behavior. In contrast, salesman 400A begins his path 402A by approaching the group 420 as they enter the store and then follows a path that substantially tracks that of both the group as a whole and that of group member "a" as may be determined through a regression method. Furthermore, salesman 400A and group member "a" are shown within each other's personal social space $\langle d \rangle$. The length of time that the salesman 400A spends within the personal social space of group member "a" and/or any other member of the group 420 may also be used, as previously described, as a factor in determining whether an association has occurred between him and the group of visitors 420. Although not shown in FIG. 4, other behaviors such as bodily contact and eye contact may also be taken into account in making this determination, again, as previously described herein.

Figure 5:
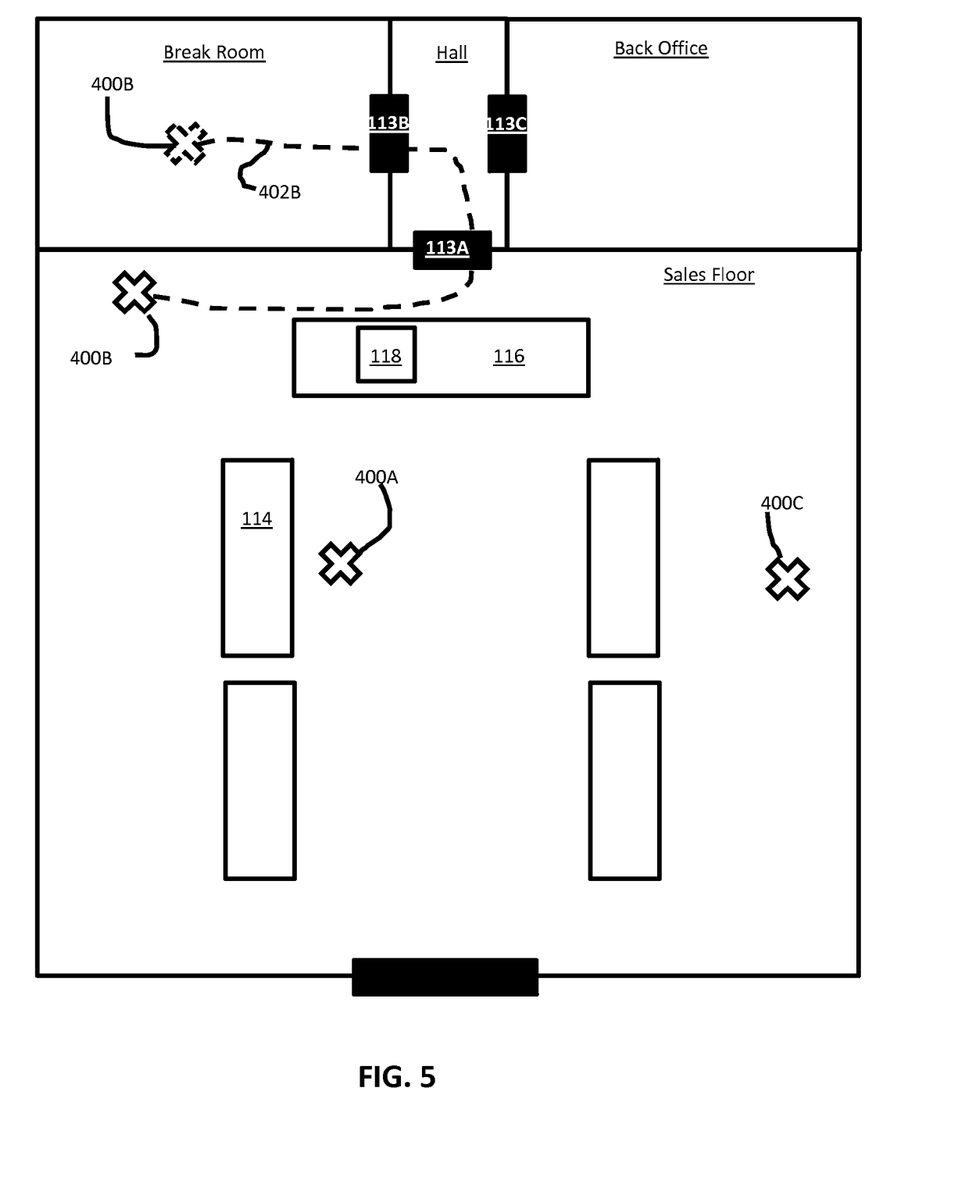
FIG. 5 is a plan view diagram illustrating a monitored space divided into sections for monitoring the conduct of employees.

FIG. 5 illustrates an embodiment where a monitored space is divided into sections for the purpose of additionally monitoring the conduct of employees. More specifically, FIG. 5 shows the monitored space divided into sections labeled "sales floor", "break room", "hall", and "back office". Salesman 400B is shown traveling along a path 402B from the break room to the sales floor. The embodiment tracks the position of the salesman 400B using the Wi-Fi grid 122 and Wi-Fi enabled device 123 both illustrated in FIG. 2. Thus, an embodiment can track how much time the salesman 400B spends on the sales floor versus the break room or other areas of the monitored space during a work day. Accordingly, employee accountability may be enhanced.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

1. A system for retail resource management, comprising:
   a plurality of electronic video cameras each having an electronic video data output, the plurality of electronic video cameras being adapted for installation in a space to be monitored and configured for monitoring the space;
   a central computer adapted to receive the electronic video data outputs of the plurality of video cameras; and
   a computer program installable on the central computer and adapted to:
   distinguish human subjects from inanimate objects;
   distinguish agent human subjects from non-agent human subjects, in the video data output from the plurality of electronic video cameras;
   identify interacting non-agent human subjects by correlating the non-agent human subjects' movements, proximity, length of time that the human subjects spend within a predefined proximity of each other within the monitored space, whether the human subjects make bodily contact with each other, duration of bodily contact between human subjects, parts of the human subjects' bodies involved in bodily contact, whether the human subjects make eye contact, duration of eye contact; and associate individual non-agent human subjects, and/or groups of interacting non-agent human subjects, with an agent by correlating, relative to the agent, the non-agent human subjects' movements, proximity, length of time that the non-agent human subject spends within a predefined proximity of the agent, whether the non-agent human subjects make bodily contact with the agent, duration of bodily contact between the agent and non-agent human subjects, parts of the agent and non-agent human subjects' bodies involved in bodily contact, whether the agent and non-agent human subjects make eye contact, and duration of eye contact.

2. The system of claim 1, wherein the computer program is further adapted to count the number of non-agent human subjects, or correlated groups of non-agent human subjects, who enter, who are present in, and/or who exit the monitored space.

3. The system of claim 2, wherein the computer program is further adapted to calculate retail conversion rates based on the number of non-agent human subjects, or correlated groups of non-agent human subjects, visiting the monitored space.

4. The system of claim 2, wherein the computer program is further adapted to calculate the close rate of an agent.

5. The system of claim 1, further comprising a plurality of wireless identification devices adapted to be paired with agents of the monitored space, and at least one wireless reader installable in the monitored space and adapted to read identification data contained in the wireless identification devices.

6. The system of claim 5, wherein the central computer is further adapted to receive identification device data from the at least one wireless reader and record the identification device data as a function of time.

7. The system of claim 6, wherein the at least one wireless reader comprises a plurality of wireless readers installable in the monitored space according to a predetermined spatial pattern, and wherein the central computer is further adapted to receive signals from the plurality of wireless readers to calculate and track the position of agents in the monitored space.

8. The system of claim 7, wherein the computer program is further adapted to track the amount of time that an agent spends in areas of the monitored space other than the sales floor.

9. The system of claim 1, wherein the computer program is further adapted to track the number of non-agent human subjects, or groups of interacting non-agent human subjects, who leave the monitored space without being associated with an agent.

10. The system of claim 1, wherein the computer program further comprises a reporting feature adapted to present data collected by the system in tabular and/or graphical form.

* * * * *